(12) United States Patent
Williams

(10) Patent No.: US 8,851,244 B2
(45) Date of Patent: Oct. 7, 2014

(54) PARKING BRAKE CONTROLLER AND SYSTEM FOR AIR BRAKE VEHICLES

(76) Inventor: Frank Williams, Silverton, OR (US)

(*) Notice: Subject to any disclaimer, the term of this patent is extended or adjusted under 35 U.S.C. 154(b) by 160 days.

(21) Appl. No.: 13/528,346

(22) Filed: Jun. 20, 2012

(65) Prior Publication Data

US 2012/0325602 A1 Dec. 27, 2012

Related U.S. Application Data

(60) Provisional application No. 61/499,260, filed on Jun. 21, 2011.

(51) Int. Cl.
*B60T 7/08* (2006.01)
*B60T 13/38* (2006.01)
*B60T 15/04* (2006.01)

(52) U.S. Cl.
CPC .. *B60T 13/38* (2013.01); *B60T 7/08* (2013.01); *B60T 15/041* (2013.01)
USPC .......................................................... 188/170

(58) Field of Classification Search
CPC ......... B60T 13/38; B60T 15/041; B60T 7/08; B60T 7/085; B60T 7/101
USPC .......................................................... 188/170
See application file for complete search history.

(56) References Cited

U.S. PATENT DOCUMENTS

| | | | |
|---|---|---|---|
| 3,982,792 A * | 9/1976 | Nakajima | 303/9.61 |
| 7,216,941 B2 * | 5/2007 | Thomas | 303/89 |
| 2011/0108374 A1 * | 5/2011 | Call et al. | 188/33 |

* cited by examiner

*Primary Examiner* — Anna Momper
(74) *Attorney, Agent, or Firm* — DWC Law Firm, P.S.; David Chen

(57) ABSTRACT

A push/pull valve controller, including a switch and a fluid actuator, and system for use in combination with a push/pull valve to set and release a parking (or emergency) brake in a vehicle having an air brake system. The push/pull valve controller and system may further include additional safety features, such as a key lock.

12 Claims, 6 Drawing Sheets

PARKING BRAKE CONTROLLER AND SYSTEM FOR AIR BRAKE VEHICLES

CROSS REFERENCE TO RELATED APPLICATION

This application claims the benefit of U.S. provisional patent application Ser. No. 61/499,260, filed Jun. 21, 2011, which is incorporated herein by reference in its entirety.

BACKGROUND

1. Technical Field

The present disclosure relates to devices, systems, and methods for controlling parking and/or emergency brakes in vehicles having an air brake system.

2. Description of Related Art

Conventional heavy-duty vehicle air brake systems use mechanical pneumatic push/pull valves to set and release a vehicle parking brake. An air parking brake system uses compressed air to apply the service brakes and parking brake. A brake pedal located on the floor of a vehicle cab is usually depressed to actuate the service brake, whereas a push/pull handle located on the vehicle dash is used to actuate the parking brake. The parking brake is generally a spring brake that is normally engaged, meaning air pressure must be applied to the parking brake chamber in order to release it. That is, when there is no air pressure present, the parking brake is applied. In contrast, air pressure is required to set service brakes (i.e., depressing the brake pedal actuates a control valve allowing air pressure to travel to the service brake). Therefore, if a vehicle loses air pressure, then it loses the ability to apply the service brakes. But, this also means the parking brake will automatically engage to slow the vehicle down. Similarly, when the vehicle is parked and/or not in use, the operator can engage the parking brake to prevent the vehicle from moving from the parked position.

Most large over the road vehicles, school buses, transit vehicles and others have air brakes. In many states, including Washington and Oregon, for example, there are regulations requiring school bus operators to set the parking brake each time a student is loaded (or unloaded), which means the brake must then be released to continue to the next stop. Actuating parking brakes on most buses (and other vehicles with air brakes) requires an extended reach and a high push/pull force to operate with each pickup and drop off (see Washington Department of Labor and Industries, memo August 2010). Consequently, setting and releasing a school bus parking brake using a push/pull valve repeatedly throughout a work shift can leave drivers with sore or seriously injured shoulders, elbows, and/or wrists.

One solution to this problem has been to use a mechanical lever that fits under the push/pull valve button, which allows drivers to place his/her fingers under the lever to mechanically set the brake. But, the lever does not provide any assistance in releasing the brake (see www.maxiebrakerelease.com). Other systems only set the parking brake by placing a dump valve, activated by the student load lights and the door switch, in the brake line between the air supply and the push/pull valve (see www.safetybrake.com), or only set the brake when the driver has left the driver's seat and opened the door (see U.S. Pat. No. 6,322,159).

From the foregoing, a need is apparent for alternative or improved push/pull valve devices, systems, and methods for controlling parking and/or emergency brakes in vehicles having an air brake system so that injury to operators of such vehicles is decreased, minimized or eliminated.

BRIEF SUMMARY

In certain aspects of the present disclosure, a push/pull valve switch controller is provided, which includes a switch and an air actuator operatively linked together by a first and a second air line. The operatively linked switch and air actuator are also operatively linked to a push/pull valve. The switch can be set to a first position for supplying air pressure through the first air line to the air actuator that allows air pressure into the push/pull valve to release a parking brake, and the switch can be set to a second position for supplying air pressure through the second air line to the air actuator that promotes venting of air pressure from the push/pull valve to set the parking brake. In some embodiments, the switch controller operates the handle of the push/pull valve, which in turn, releases or sets the brake, as will be appreciated by those skilled in the art after reviewing this disclosure. In certain embodiments, the push/pull valve can be operated by independently using either the push/pull valve switch controller or the push/pull valve handle in order to set or release a vehicle parking brake.

In some embodiments of the present disclosure, a push/pull valve controller can have an air actuator located upstream, downstream or integral to the push/pull valve. In certain embodiments, the air actuator can be an air cylinder or a solenoid valve. In further embodiments, the push/pull valve switch controller can be located on a vehicle dashboard or integrated with the push/pull valve. In certain embodiments, the push/pull valve can be a PP-1, PP-2, PP-3, PP-5, PP-7, PP-8, PP-DC, or MV-3 valve. In still further embodiments, any of the aforementioned push/pull valve controllers can further include a key lock.

DETAILED DESCRIPTION

Figure 1:
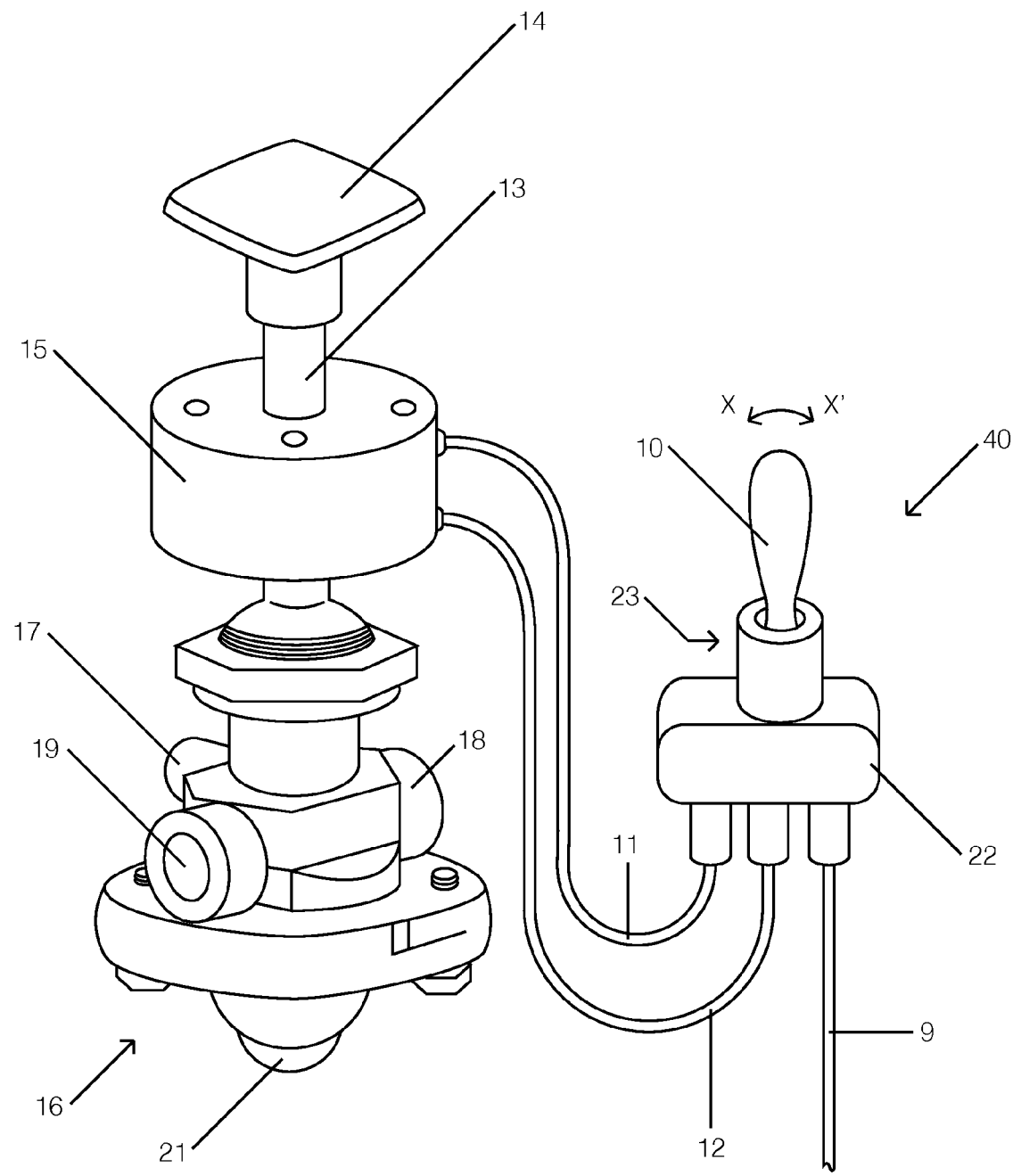
FIG. 1 is a perspective view of a push/pull valve controller embodiment of the present disclosure wherein the air actuator is an air cylinder upstream of a PP-1 valve, wherein the air supply and delivery lines of the PP-1 valve are not shown for illustration purposes only.

In the following description, certain specific details are set forth in order to provide a thorough understanding of various embodiments of this disclosure. However, upon reviewing this disclosure one skilled in the art will understand that the invention may be practiced without many of these details. In other instances, well-known or widely available machine parts (such as, for example, air compressors, valves and brake parts) have not been described in detail to avoid unnecessarily obscuring the descriptions of the embodiments of the present disclosure.

Various embodiments of the present disclosure are described for purposes of illustration, in the context of use with vehicles having an air brake system. However, as those skilled in the art will appreciate upon reviewing this disclosure, use with other machinery may also be suitable.

By way of background, an air parking brake system has air pressure routed through an air hose or line to a supply port 17 found on a push/pull valve 16. A delivery air hose or line routes the air pressure from delivery ports 18, 19 of the push/pull valve 16 to the air parking brake mechanism or chamber. The push/pull valve 16, which has a valve handle 14 attached via a rod 13, is mounted on the dash of the vehicle as required by U.S. federal regulations (see Federal Motor Vehicle Safety Standard No. 121). When the valve handle 14 is "pushed" in by the vehicle's operator, the push/pull valve 16 is open and air is allowed to pass through the supply port 17, through the open push/pull valve 16 and through the delivery ports 18, 19 into the air parking brake chamber. This air pressure supplied to the air parking brake chamber overcomes the brake spring tension, which thereby releases the air parking brake and allows for free movement of the vehicle's wheel(s). Conversely, when the valve handle 14 is "pulled" out, the push/pull valve 16 is closed and the air source is cut off from the delivery ports 18, 19, so the air parking brake chamber is vented through an exhaust vent 21 located on the push/pull valve 16. This release of air pressure from the air parking brake chamber allows the brake springs to expand and set the parking brake to inhibit movement of the vehicle's wheel(s).

Referring to FIG. 1, in some embodiments of the present disclosure, a push/pull valve switch controller 40 is provided, having a switch 23 (which can be operably connected to, for example, a solenoid valve 22), and an air actuator 15, the switch and air actuator operatively linked by a first air line 11 and a second air line 12. An air supply line 9 fluidly connected to the parking brake provides air pressure to the push/pull valve switch controller system—that is, directly to the switch or solenoid valve of the switch. The push/pull valve 16 will also have an air supply line (not shown) that is attached to supply port 17, as well as air delivery lines (not shown) attached to delivery ports 18, 19. In this particular embodiment, the switch is a toggle switch 10 and can be moved from a first position "X" to a second position "X'".

For example, a switch 23 can be set up so that when the switch toggle 10 is moved into first position "X," air pressure provided by the air supply line 9 is allowed to flow into the first air line 11 and into the air actuator 15. Air pressure in the first air line 11 will push, for example, a piston or diaphragm (not visible in FIG. 1, but can be seen in FIGS. 3-5) located inside the air actuator 15 toward the base of the push/pull valve (wherein the base of the push pull valve includes supply port 17, delivery ports 18, 19, and exhaust valve 21, which can be located behind the dash of the vehicle cab), which will "push" in (i.e., open) the push/pull valve 16 to allow air into delivery ports 18, 19 and air pressure into the air parking brake chamber to release the parking brake. In this embodiment then, the switch toggle 10 moved into second position "X'" may allow air pressure provided by the air supply line 9 into the second air line 12 and into the air actuator 15. In this embodiment, air pressure in the second air line 12 will push, for example, a piston or diaphragm (not visible in FIG. 1, but can be seen in FIGS. 3-5) located inside the air actuator 15 away from the base of the push/pull valve (i.e., away from the dash), which will be equivalent to "pulling" out (i.e., closing) the push/pull valve 16 to block air flow into delivery ports 18, 19. Consequently, air pressure does not enter the air parking brake chamber, which results in venting through the exhaust vent 21 and thereby allowing the parking brake to set.

In further embodiments, the switch 23 can be set up in a reverse orientation so that when the switch toggle 10 is moved into positions "X" and "X'," the push/pull valve 16 will be closed and open, respectively. A person of skill in the art can readily set the switch 23 in a desired orientation.

Figure 2:
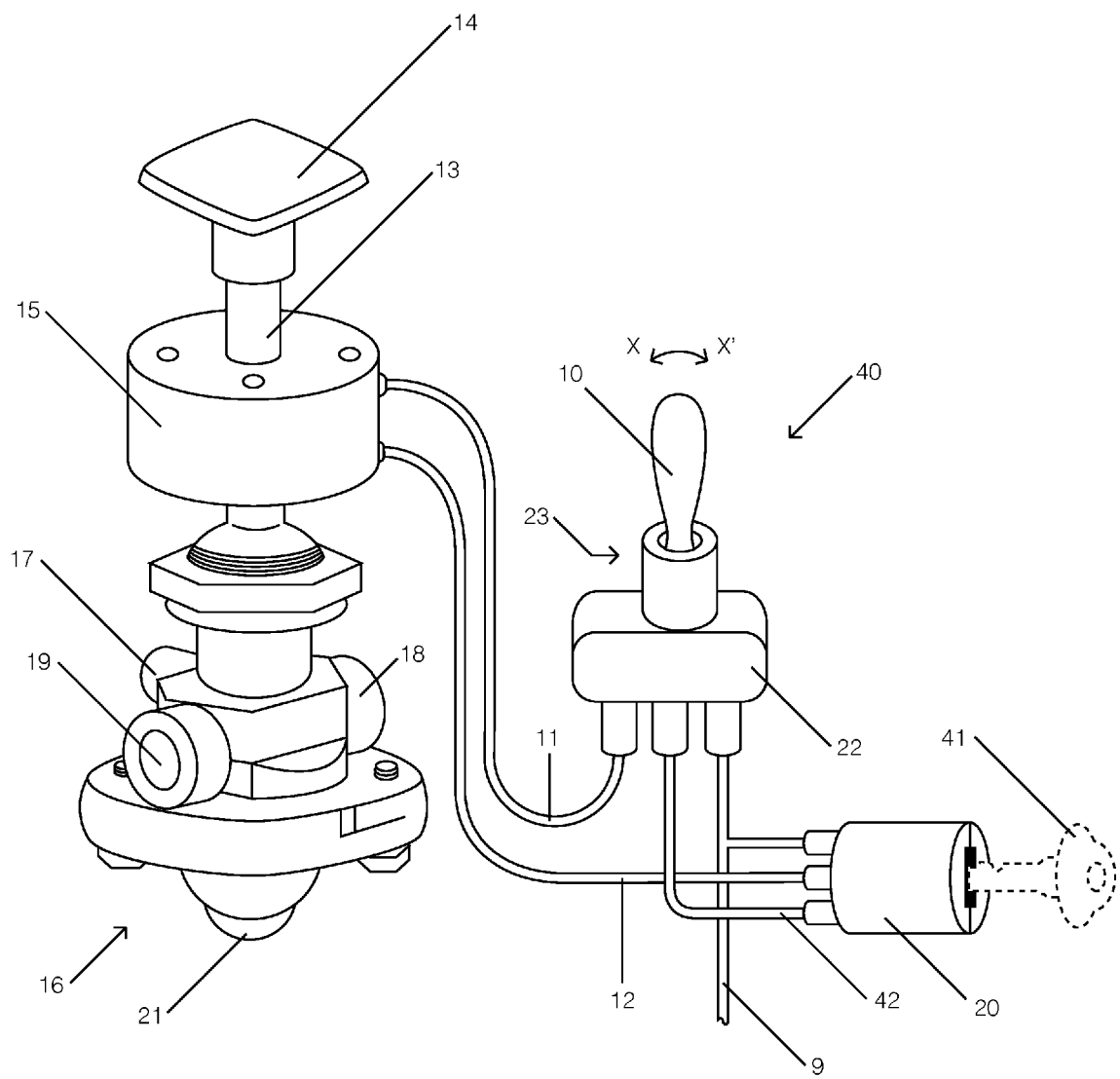
FIG. 2 is a perspective view of the push/pull valve controller of FIG. 1, further comprising an exemplary key lock.

As illustrated in FIG. 2, the push/pull valve switch controller 40 embodiments provided in FIG. 1 can further contain a parking brake lock 30. In the embodiment of FIG. 2, an exemplary brake lock 20 as illustrated is a key 41 lock, which can be turned to an unlocked position (i.e., the push/pull valve switch controller 40 is responsive when the switch 23 is toggled from the first position "X" to the second position "X'" or vice-versa) or to a locked position (i.e., the push/pull valve switch controller 40 is non-responsive when the switch 23 is toggled to move the push/pull valve 16 into an open position). The difference in the plumbing between the push/pull valve switch controller 40 of FIGS. 1 and 2 is that the air pressure from supply line 9 in FIG. 2 now passes from the switch 23 through air delivery line 42 to the brake lock 20 before passing through the second air line 12 into the air actuator 15.

Figure 3:
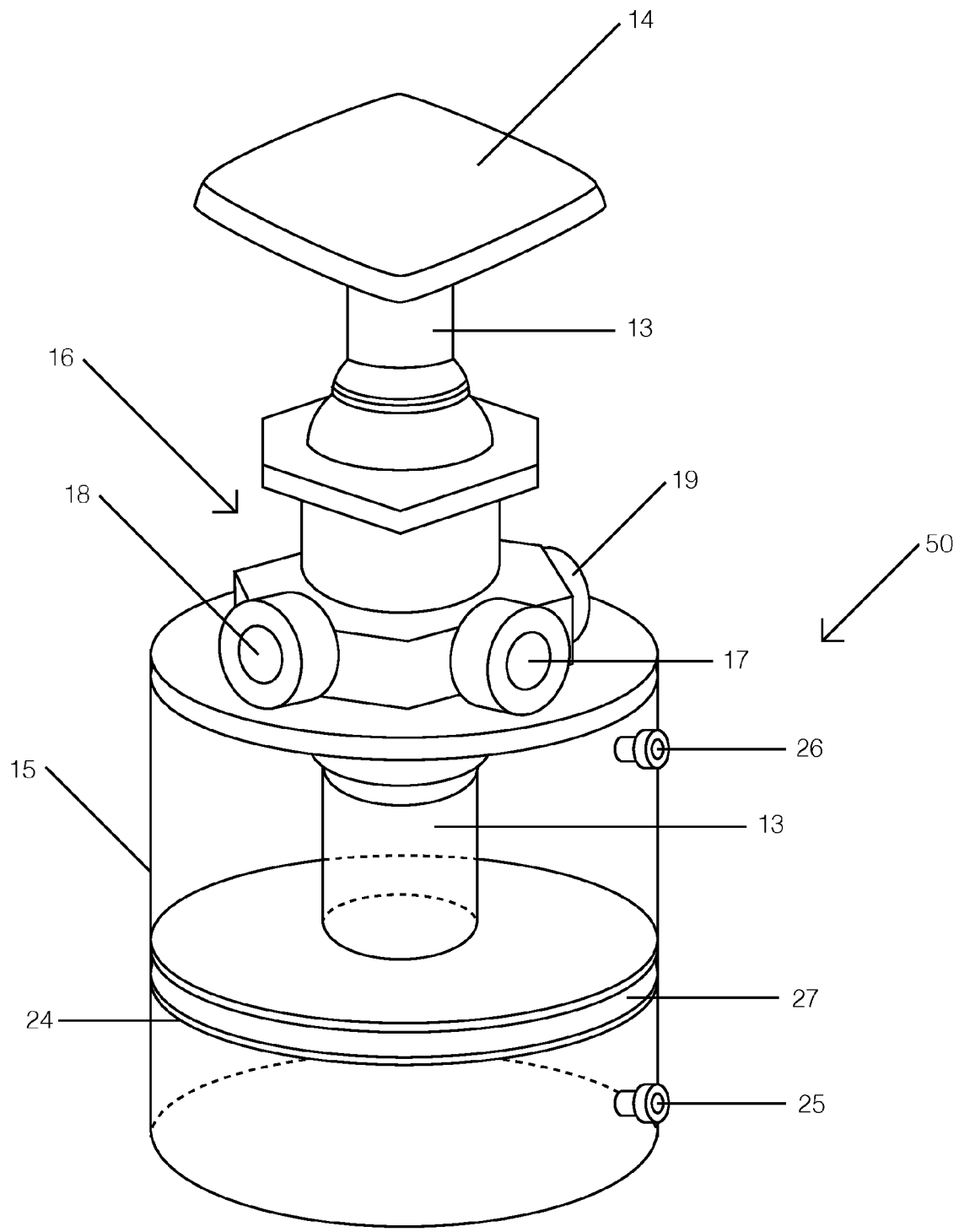
FIG. 3 is a perspective view of a push/pull valve controller embodiment of the present disclosure wherein the air actuator is an air cylinder integrated into a PP-1 valve, wherein the air supply and delivery lines of the PP-1 valve are not shown for illustration purposes only. A cut away view of the air cylinder is provided to show the rod and piston, as well as the relative positions of the release and set ports inside the air cylinder.
Figure 4:
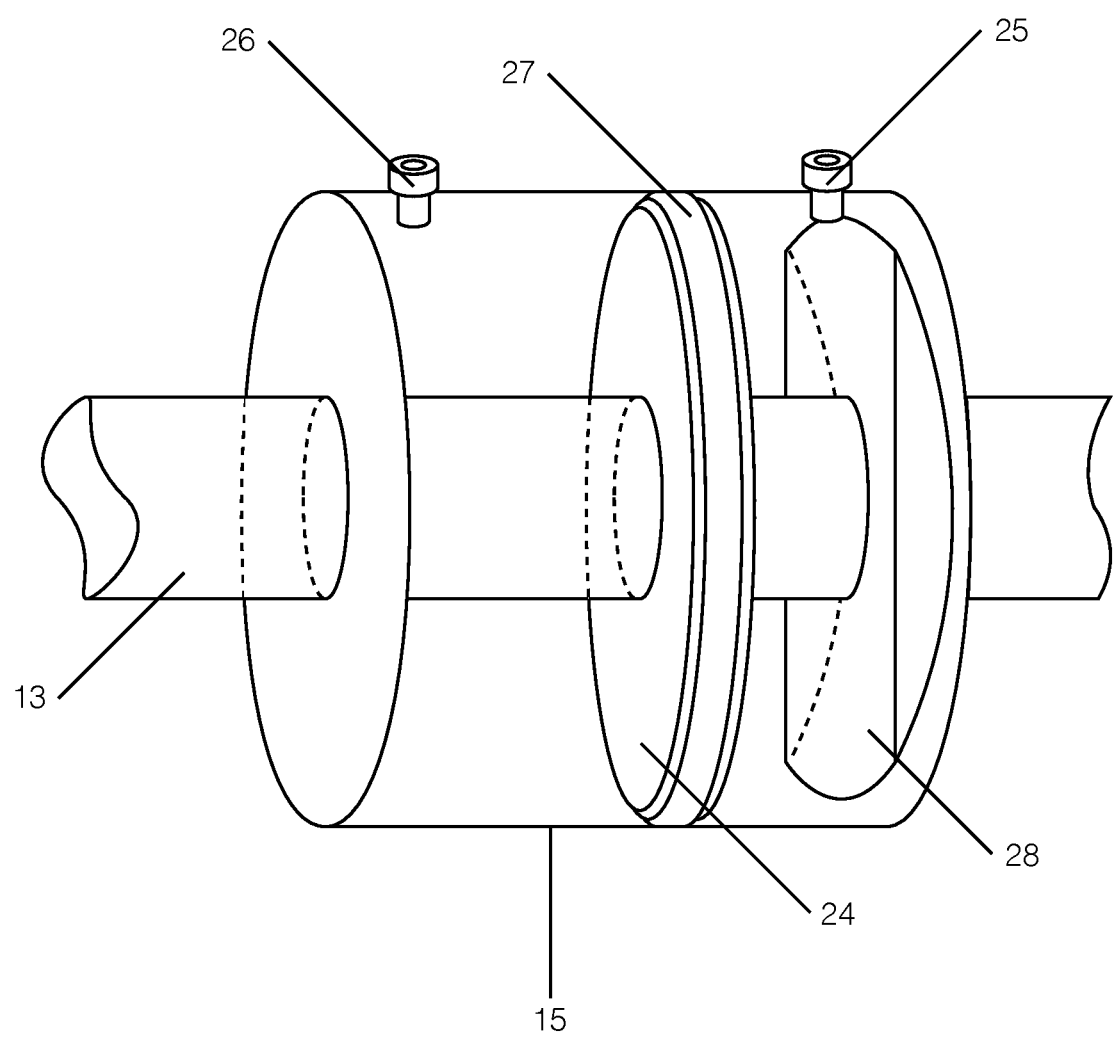
FIG. 4 is a cut-away view of an air cylinder upstream of a PP-1 valve embodiment of the present disclosure showing a spring washer located on set port side of the piston.

Referring to FIG. 3, in some embodiments of the present disclosure, a push/pull valve 16 and an air actuator 15 are combined or integrated to create a push/pull/actuator valve switch controller 50, which includes a switch (not shown). The switch can be operatively linked to the push/pull/actuator valve controller 50 by a first air line 11 and a second air line 12 (neither of which is shown in FIG. 3; see FIGS. 1 and 2), which are connected to a release port 26 and a set port 25, respectively. As with the embodiments of FIGS. 1 and 2, an air supply line 9 fluidly connected to the parking brake provides air pressure to the push/pull/actuator valve switch controller system—that is, directly to the switch.

In certain embodiments, the push/pull/actuator valve switch controller 50 includes a valve handle 14 attached to a piston 24 via a rod 13, wherein the rod extends through the push/pull valve 16 into the air actuator 15 and is connected to a piston 24 located therein. Air flowing into release port 26 provides air pressure to the piston 24 on the surface that is proximal to push/pull valve and connected to the rod 13. Air flowing into set port 25 provides air pressure to the piston 24 surface that is distal to the push/pull valve 16. In certain embodiments, the piston 24 is slidably in contact with the inner surface of the air actuator 15 via, for example, an O-ring 27.

Figure 6:
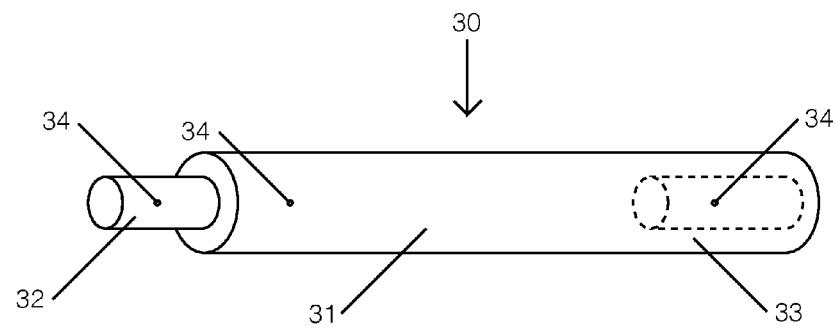
FIG. 6 is a perspective view of an exemplary center shaft useful in a push/pull valve controller embodiment of the present disclosure wherein an air cylinder is located upstream of a PP-1 valve.
Figure 7:
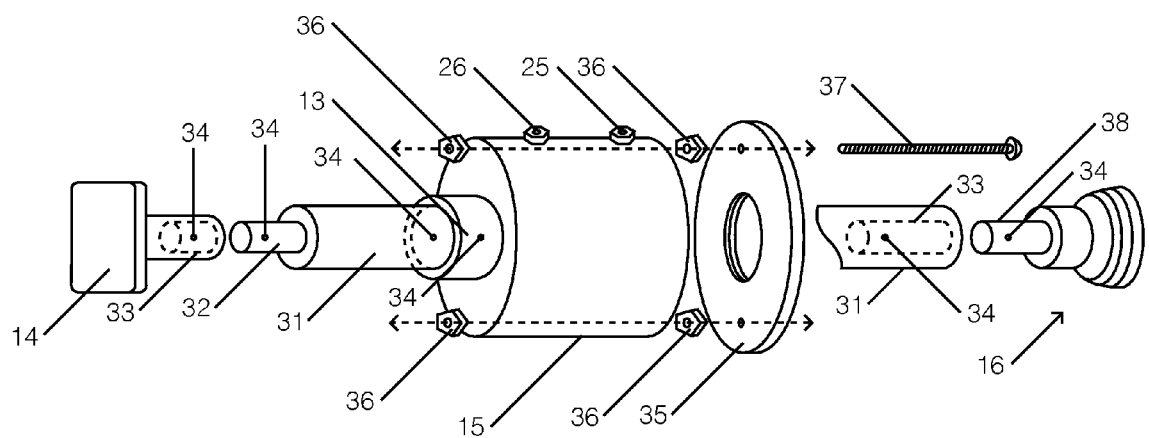
FIG. 7 is an exploded view of a push/pull valve controller for an embodiment of the present disclosure wherein an air cylinder is upstream of a PP-1 valve and a center shaft is disposed between and can be releasably connected to the valve handle on one end and the push/pull valve at the other end.

In further embodiments, a push/pull valve switch controller 40 of the present disclosure (such as those shown, for example, in FIGS. 1 and 2) may further comprise a central connecting rod 30. An exemplary central connecting rod 30 is illustrated in FIG. 6, wherein the connecting rod comprises a main body 31 disposed between a coupling end portion (or stem) 32 having a diameter more narrow than the main body 31 and a coupling recess portion 33 having a diameter more narrow than the main body 31 and capable of releasably accepting a coupling stem.

In the embodiment of FIG. 3, a switch (not shown) of the push/pull/actuator valve switch controller 50 unit may allow air pressure through the air supply line into the release port 26. This air pressure in the release port 26 will push, for example, a piston 24 located inside the air actuator 15 away from the push/pull valve 16 (e.g., away from the vehicle cab dash), which will "push" in (i.e., open) the push/pull valve 16 to allow air pressure into the air parking brake chamber and thereby release the parking brake. When the switch is moved into a different position, this may allow air pressure into the set port 25. In this case, air pressure will push the piston 24 in the air actuator 15 toward the push/pull valve 16 (e.g., toward the dash), which will be equivalent to "pulling" out (i.e., closing) the push/pull valve 16 to block air pressure from entering the air parking brake chamber and venting will thereby allow the parking brake to set.

Furthermore, in any embodiment of this disclosure, the push/pull valve 16 will also have an air supply line (not shown) that is attached to a supply port 17, as well as air delivery lines (not shown) attached delivery ports 18, 19, such that a vehicle operator may manually operate the push/pull valve 16 independent of the particular switch controller embodiment that is present.

In still further embodiments, the switch 23 may be located on a vehicle's dash at a certain distance from a push/pull valve switch controller 40 (see FIG. 1 or 2) or a push/pull/actuator valve switch controller 50 (see FIG. 3, switch not shown), or the switch may be located on a vehicle's dash as an integral part of a push/pull valve switch controller 40 or a push/pull/actuator valve switch controller 50. Moreover, a person of skill in the art will appreciate that a switch may be any type suitable for this system, including, for example, a push-button switch, a rocker switch, a foot switch, a relay switch, an electromechanical switch, an electric switch, an electronic switch, or the like. In any of the aforementioned embodiments, the switch controller operates the handle 14 and rod 13 of the push/pull valve 16, which in turn, releases or sets the break. One advantage of the present invention is injury and/or fatigue caused by repeated use of a push/pull valve can be minimized or eliminated for operators of vehicles having an air brake system and a controller switch of this disclosure.

Figure 5:
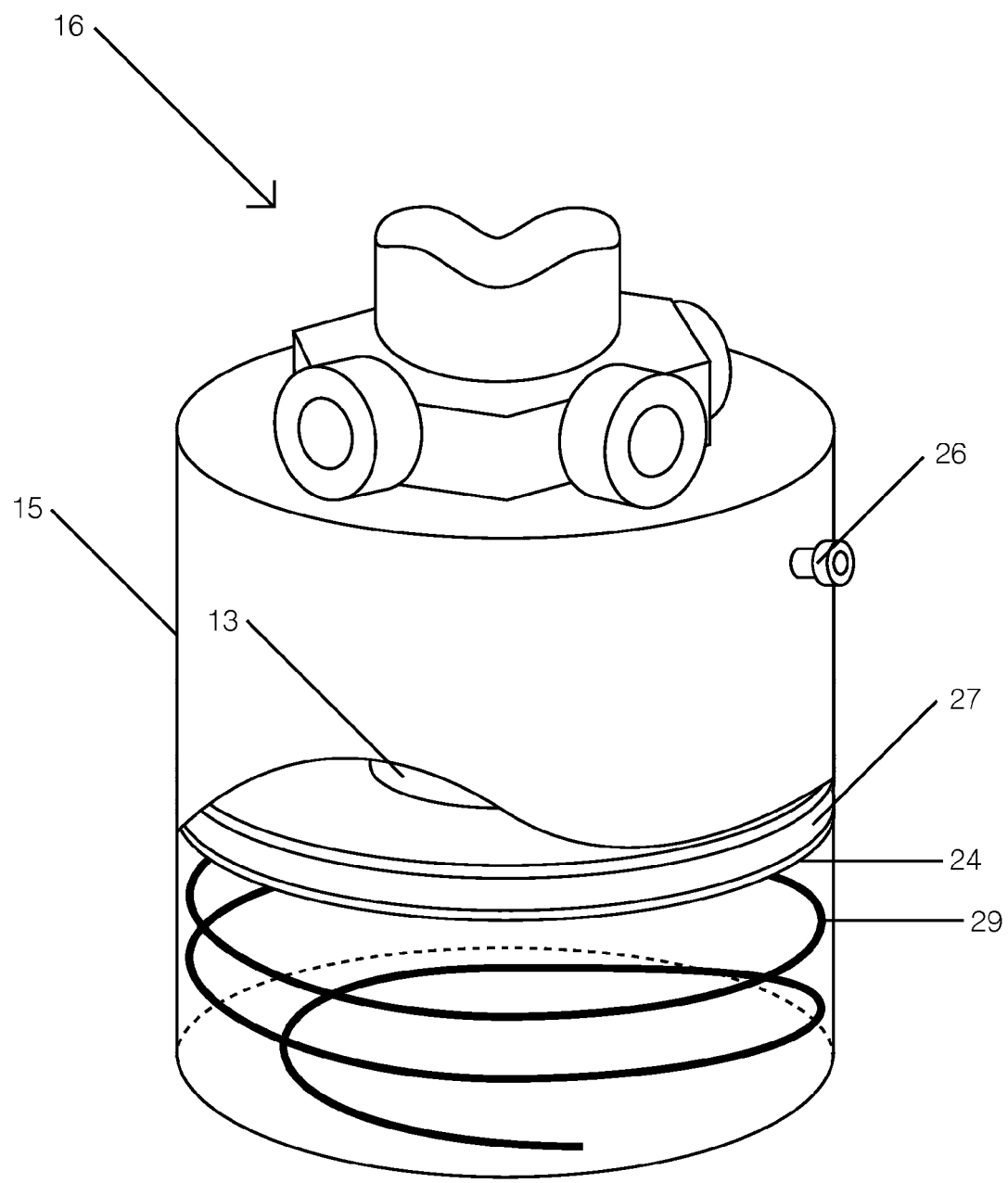
FIG. 5 is a cut-away view of an air cylinder integrated into a PP-1 valve embodiment of the present disclosure showing a spring located on set port side of the piston.

In any of the aforementioned embodiments, the push/pull valve switch controller 40 or the push/pull/actuator valve switch controller 50 may further comprise a biasing element, such as a spring washer 28 (see FIG. 4) or a spring 29 (see FIG. 5), located within the air actuator 15 and on the piston 24 face that is either proximal to the push/pull valve 16 (see, e.g., FIGS. 1, 2, 4, 7) or is distal to the push/pull valve 16 (see, e.g., FIGS. 3, 5). By way of illustration and not wishing to be bound by theory, a biasing element may be helpful in overcoming any friction that may arise from a piston 24 O-ring 27 contacting the inner wall of an air actuator 15. In certain embodiments of FIG. 1 or 2, an optional biasing element is present within the air actuator 15 and is a spring washer 28 or a spring 29. In certain embodiments of FIG. 3, an optional biasing element is present within the air actuator 15 and is a spring washer 28 or a spring 29. Preferably, the spring 29 is a weak or low-tension spring.

In some embodiments, if a failure occurs in the switch (either air or electric) which causes the air parking brake system to fail to work as designed, the system will de-activate and shut itself down to allow for the normal operation of the PP1 or any other valve that might be installed on the vehicle.

If an electric switch is installed to activate the system and the switch fails by supplying constant voltage to a solenoid, that pulse will be monitored and if it exceeds a predetermined length of time, the system will interrupt the power to the switch and disable the system, thereby allowing the brake button to operate normally. If the switch is an air switch, the pulse length of the air pressure supplied to the cylinder will be monitored and if it exceeds a predetermined length, the air supply will be interrupted and the system will be disabled to allow for normal of the parking brake button/valve.

Although specific embodiments and examples of this disclosure have been described supra for illustrative purposes, various equivalent modifications can be made without departing from the spirit and scope of the invention, as will be recognized by those skilled in the relevant art after reviewing the present disclosure. The various embodiments described can be combined to provide further embodiments. The described devices, systems and methods can omit some elements or acts, can add other elements or acts, or can combine the elements or execute the acts in a different manner or order than that illustrated, to achieve various advantages of the invention. These and other changes can be made to the invention in light of the above detailed description.

In general, in the following claims, the terms used should not be construed to limit the invention to the specific embodiments disclosed in the specification. Accordingly, the invention is not limited by the disclosure, but instead its scope is determined entirely by the following claims.

What is claimed is:

1. A brake system controller comprising:
    a switch and an air actuator operatively linked together, wherein the operatively linked switch and air actuator are also operatively linked to a push/pull valve;
    wherein the switch is operatively linked to the air actuator by a first and a second air line, the switch capable of being set to a first position for supplying air pressure through the first air line to the air actuator that allows air pressure into the push/pull valve to release a parking brake and to a second position for supplying air pressure through the second air line to the air actuator that promotes venting of air pressure from the push/pull valve to set the parking brake; and
    wherein the push/pull valve can be independently operated to set or release the parking brake of a vehicle by use of either the switch or a push/pull valve handle.

2. The brake system controller of claim 1 wherein the air actuator is upstream of the push/pull valve.

3. The brake system controller of claim 1 wherein the air actuator is downstream of the push/pull valve.

4. The brake system controller of claim 1 wherein the air actuator is integrated into the push/pull valve.

5. The brake system controller according to any one of the previous claims wherein the air actuator is an air cylinder or a solenoid valve.

6. The brake system controller of claim further comprising a key lock connected to the switch.

7. An air parking brake control system, comprising:
    a push/pull valve controller comprising a switch and a fluid actuator operatively linked together that are also operatively linked to a push/pull valve;
    a source of fluid pressure;
    wherein the push/pull valve controller and the push/pull valve fluidly couple a parking brake chamber to the source of fluid pressure; and
    wherein the switch in a first position actuates the fluid actuator and push/pull valve to supply fluid pressure to the parking brake chamber to release a parking brake, and wherein the switch in a second position actuates the fluid actuator and push/pull valve to vent the fluid pressure from the parking brake chamber to set the parking brake.

8. The air parking brake control system of claim 7 wherein the fluid actuator is upstream of the push/pull valve.

9. The air parking brake control system of claim 7 wherein the fluid actuator is downstream of the push/pull valve.

10. The air parking brake control system of claim 7 wherein the fluid actuator is integrated into the push/pull valve.

11. The air parking brake control system of claim 7 wherein the fluid actuator is an air cylinder or a solenoid valve.

12. The air parking brake control system of claim 7 wherein the push/pull valve controller further comprises a key lock.

* * * * *